United States Patent
Oren

(10) Patent No.: US 9,248,920 B2
(45) Date of Patent: Feb. 2, 2016

(54) MONITORING OF STEERING-ANGLE DURING AIRCRAFT TRANSPORT

(71) Applicant: ISRAEL AEROSPACE INDUSTRIES LTD., Lod (IL)

(72) Inventor: Avitzur Oren, DN Mizrach Binyamin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 14/580,474

(22) Filed: Dec. 23, 2014

(65) Prior Publication Data

US 2015/0203157 A1 Jul. 23, 2015

(30) Foreign Application Priority Data

Dec. 23, 2013 (IL) .......................................... 230099

(51) Int. Cl.
  *B62D 15/02* (2006.01)
  *B64F 1/22* (2006.01)

(52) U.S. Cl.
  CPC .................. *B64F 1/225* (2013.01); *B64F 1/227* (2013.01)

(58) Field of Classification Search
  CPC ...... B62D 15/024; B62D 15/029; B64F 1/225
  See application file for complete search history.

(56) References Cited

U.S. PATENT DOCUMENTS

| | | | |
|---|---|---|---|
| 4,745,410 A | 5/1988 | Schuller et al. | |
| 5,513,821 A | 5/1996 | Ralph | |
| 5,516,252 A | 5/1996 | Francke et al. | |
| 5,680,125 A * | 10/1997 | Elfstrom et al. | 340/958 |
| 7,477,973 B2 | 1/2009 | Brewer et al. | |
| 7,856,293 B2 | 12/2010 | Furgal | |
| 8,094,042 B2 | 1/2012 | Read et al. | |
| 2005/0196256 A1 | 9/2005 | Rodenkirch et al. | |
| 2011/0046819 A1 | 2/2011 | Bailbe et al. | |
| 2011/0147514 A1 | 6/2011 | Straub et al. | |
| 2012/0089277 A1 | 4/2012 | Oyama | |

FOREIGN PATENT DOCUMENTS

| | | |
|---|---|---|
| DE | 19808836 | 9/1999 |
| EP | 0 219 664 A1 | 4/1987 |
| EP | 0934879 | 11/1999 |
| EP | 1 574 430 A1 | 9/2005 |
| GB | 2 297 158 A | 7/1996 |
| JP | 8207900 | 8/1996 |

* cited by examiner

*Primary Examiner* — Mary Cheung
*Assistant Examiner* — Yuen Wong
(74) *Attorney, Agent, or Firm* — Browdy and Neimark, PLLC

(57) ABSTRACT

The subject matter disclosed herein includes, inter alia, a method and system which enables to determine the steering-angle between the longitudinal axis of a tractor and the longitudinal axis of an aircraft which is being led by the tractor (referred to herein as "steering-angle" in short). While an aircraft is being led, the steering-angle can be repeatedly calculated and compared to a threshold value defining a mechanical steering limit. In case the comparison complies with one or more predefined conditions (e.g. the steering-angle is equal or smaller the threshold value) a warning can be generated indicating to an operator that the steering-angle has reached (or is about to reach) its limit and should be adjusted accordingly.

20 Claims, 9 Drawing Sheets

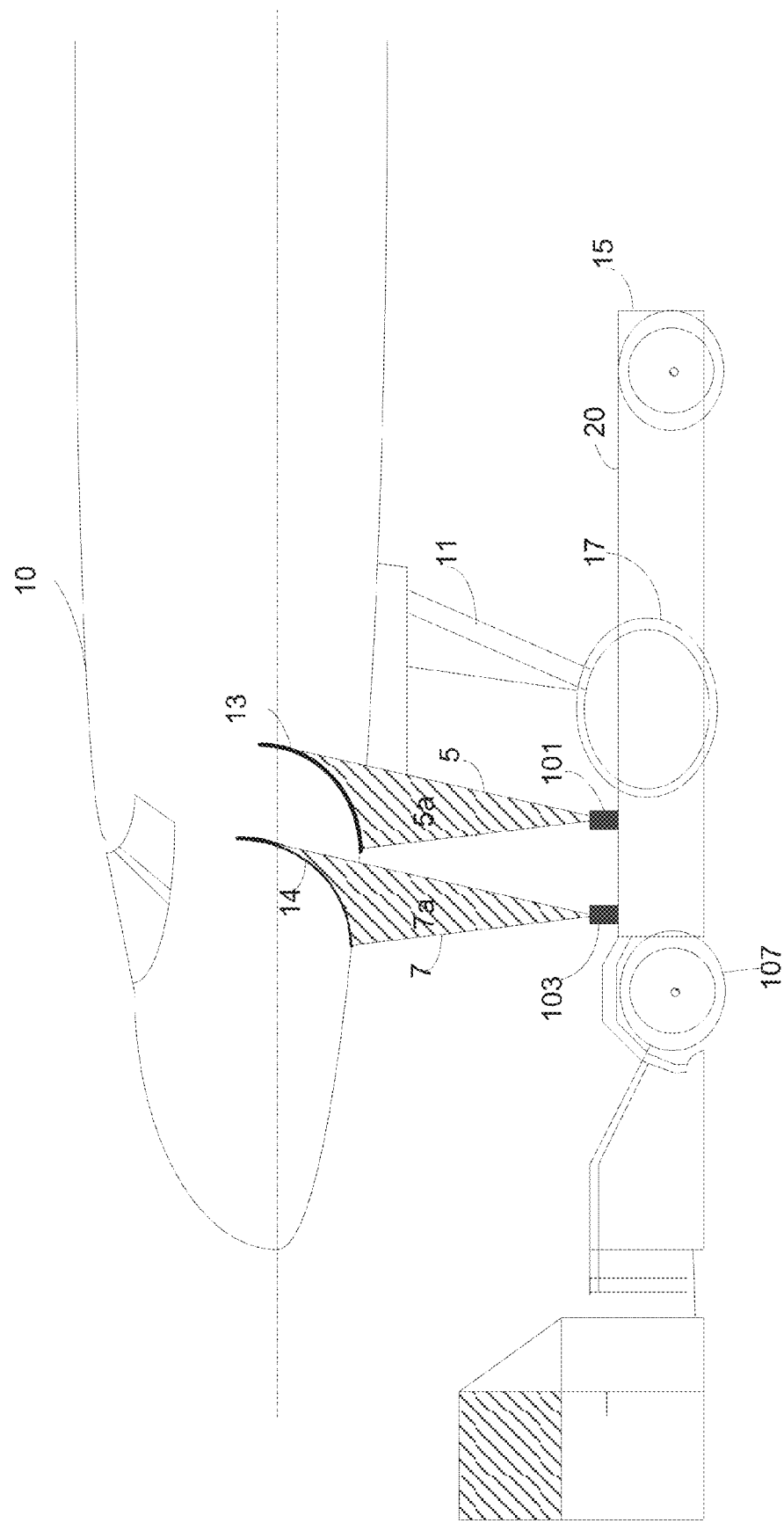

MONITORING OF STEERING-ANGLE DURING AIRCRAFT TRANSPORT

FIELD OF THE PRESENTLY DISCLOSED SUBJECT MATTER

This invention relates to the field of transportation of an aircraft on the ground.

BACKGROUND

When aircrafts (e.g. airplanes) are on the ground, after landing and before takeoff, they are often led from one location to the next in an airport by designated vehicles called tractors or tugs. These vehicles are used to push or pull the aircraft around the airfield. One common example of such aircraft transport is a pushback procedure during which a tractor pushes an aircraft away from an airport gate. Aircrafts are also pushed and/or pulled for various other maintenance purposes.

Tractors dedicated for leading aircrafts often comprise a low profile platform designed in order to fit under the aircraft's underbelly and connect to the aircraft near the aircraft's nose landing gear (NLG) and in some cases under the aircraft's NLG.

While an aircraft is being led (pushed or pulled) by a tractor, steering of the tractor results in a steering-angle between the body of the tractor and the body of the aircraft. Over-steering may occur when the steering-angle exceeds the given mechanical limits and may result in damage to the aircraft.

There is therefore a need in the art for a system and method which enable to monitor the steering-angle, and alert an operator before over-steering occurs.

Published documents considered to be relevant as background to the presently disclosed subject matter are listed below. Acknowledgement of the documents herein is not to be inferred as meaning that these are in any way relevant to the patentability of the presently disclosed subject matter.

U.S. Application Publication No. 2005196256A discloses an early warning system for a tractor operator engaged in towing or pushing an aircraft, and includes two ultrasonic sensors that are used to create a detection area in which the aircraft should be present when the steering-angle is well within a safe range. When one of the detectors fails to detect the presence of the aircraft, then the operator is alerted, before over-steering can occur, in order that corrective action can be undertaken. Accordingly, complex distance-measuring algorithms can be avoided as can the requirement that an aircraft fuselage have a specially modified detection region.

U.S. Pat. No. 5,680,125 discloses that a wheeled vehicle has a source of collimated radiation which directs a beam on a surface of the aircraft having at least two significantly different collimated radiation reflecting areas (e.g. a light material arc bounded by dark material marks). In response to radiation from the collimated beam, or lack thereof, reflected from the surface of the aircraft back to a receiver on the wheeled vehicle, it can be determined if the nose wheel steering-angle is within an acceptable range. Two beam sources and receivers may be provided, and other information-such as the size of the aircraft may also be calculated. An indicator or device for initiating corrective action may be provided to respond to insufficient reflected radiation received by the receiver.

GENERAL DESCRIPTION

According to one aspect of the presently disclosed subject matter there is provided a method of determining a steering-angle between a leading vehicle and an aircraft; the leading vehicle is connected to the aircraft and is configured to lead the aircraft on the ground; the leading vehicle comprises a platform and one or more scanners which are positioned on the platform, the method comprising:

obtaining scanning information of one or more scanning planes of the aircraft's underbelly; the scanning information is generated by the one or more scanners; the scanning information of each of the one or more scanning planes comprising a respective group of scanned points of the aircraft's underbelly;

determining, for each scanning plane, respective real-time geometric properties; the respective real-time geometric properties including at least data indicative of ranges between scanned points in the respective group and a certain fixed point on the platform;

determining, based on the real-time geometric properties, a steering-angle between the longitudinal axis of the leading vehicle and the longitudinal axis of the aircraft.

In addition to the above features, the method according to this aspect of the presently disclosed subject matter can optionally comprise one or more of features (i) to (x) below, in any desired combination or permutation.

i. wherein the method further comprises obtaining information with respect to one or more stored records; each stored record comprising data indicative of a respective steering-angle and respective geometric properties; and if similarity between the real-time geometric properties and the geometric properties in a given stored record, from the one or more stored records, complies with one or more predefined conditions, determining the real-time steering-angle based on the respective steering-angle in the given stored record;

ii. wherein the stored record comprises information indicative of a respective parabola-like image; the method further comprises:

determining, for each scanning plane a respective real-time parabola-like image; if similarity between the real-time parabola-like image and the parabola-like image in a given stored record, from the one or more stored records, complies with one or more predefined conditions, determining the steering-angle based on the respective steering-angle in the given stored record;

iii. wherein the method further comprises scanning the aircraft's underbelly in at least two scanning planes; for each scanning plane, identifying in the respective group of scanned points a respective scanned point ($SD_M$) located at the shortest distance from a predefined fixed point on the platform;

connecting the respective scanned points ($SD_M$) of the at least two scanning planes with a straight line, thereby identifying the longitudinal axis of the aircraft;

iv. wherein identification of respective scanned points $SD_M$ comprises:

for each of the two or more scanning planes, generating a parabola representing the scanned aircrafts' underbelly; determining a minimum point of the parabola;

v. wherein identification of respective scanned points $SD_M$ comprises:

for each scanning plane, determining a scanned point located at a shortest range from the fixed point on the platform;

vi. wherein identification of respective scanned points $SD_M$ comprises:

for each scanning plane, identifying two different scanned points in the respective group located at the same distance from the platform; identifying a scanned point located in the middle between the two points;

vii. wherein determination of the steering-angle is performed with the help of analytical geometry;

viii. wherein the method further comprises generating a warning indicating that over-steering is occurring or is about to occur, if the steering-angle complies with one or more predefined conditions;

ix. wherein the method further comprises repeating the determining of the steering-angle while the aircraft is being led by the leading vehicle; and continuously monitoring the steering-angle;

x. wherein the leading vehicle is a tractor configured to transport an aircraft; the tractor comprising a low profile platform configured to fit beneath the aircraft's underbelly.

According to another aspect of the presently disclosed subject matter there is provided a system for determining a steering-angle between a leading vehicle and an aircraft; the leading vehicle is connected to the aircraft and is configured to lead the aircraft on the ground; the leading vehicle comprises a platform, the system comprising:

one or more scanners operatively connectable to a processing unit, the processing unit comprising at least one processor;

the one or more scanners are positioned on the platform at a known distance from the central longitudinal axis of the leading vehicle; the one or more scanners are configured to scan the aircraft's underbelly and generate scanning information with respect to one or more scanning planes; the scanning information of each scanning plane comprising a respective group of scanned points of the aircraft's underbelly;

the processing unit is configured to:

obtain the scanning information and determine, for each scanning plane, respective real-time geometric properties; the respective real-time geometric properties including at least data indicative of ranges between scanned points in the respective group and a certain fixed point on the platform; and determine, based on the real-time geometric properties, a steering-angle between the longitudinal axis of the leading vehicle and the longitudinal axis of the aircraft.

In addition to the above features, the system according to this aspect of the presently disclosed subject matter can optionally comprise one or more of features (xi) to (xiv) listed below, in any desired combination or permutation:

xi. wherein the processing unit comprises a steering angle determination module configured to determine the steering-angle and a longitudinal axis determination module configured for identifying the longitudinal axis of the aircraft.

xii. wherein the system further comprises an alert generator configured to generate a warning indicating that over-steering is occurring or is about to occur, if the steering-angle complies with one or more predefined conditions.

xiii. wherein the one or more scanners are positioned on the central longitudinal axis of the leading vehicle.

xiv. wherein the system comprises two or more scanners, each scanner being configured to scan the aircraft's underbelly from a different position in a different scanning plane.

According to another aspect of the presently disclosed subject matter there is provided a non-transitory computer storage device readable by machine, tangibly embodying a program of instructions executable by the machine to perform a method of determining a steering-angle between a leading vehicle and an aircraft; the leading vehicle is connected to the aircraft and is configured to lead the aircraft on the ground; the leading vehicle comprises a platform and one or more scanners which are positioned on the platform, the method comprising:

obtaining scanning information of one or more scanning planes of the aircraft's underbelly; the scanning information is generated by the one or more scanners; the scanning information of each of the one or more scanning planes comprising a respective group of scanned points of the aircraft's underbelly;

determining, for each scanning plane, respective real-time geometric properties; the respective real-time geometric properties including at least data indicative of ranges between scanned points in the respective group and a certain fixed point on the platform;

determining, based on the real-time geometric properties, a steering-angle between the longitudinal axis of the leading vehicle and the longitudinal axis of the aircraft.

The system and the computer storage device, disclosed in accordance with the presently disclosed subject matter can optionally comprise one or more of features (i) to (x) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 3a is a schematic illustration of a side view of an aircraft being led by a tractor, in accordance with the presently disclosed subject matter;

DETAILED DESCRIPTION

Figure 1:
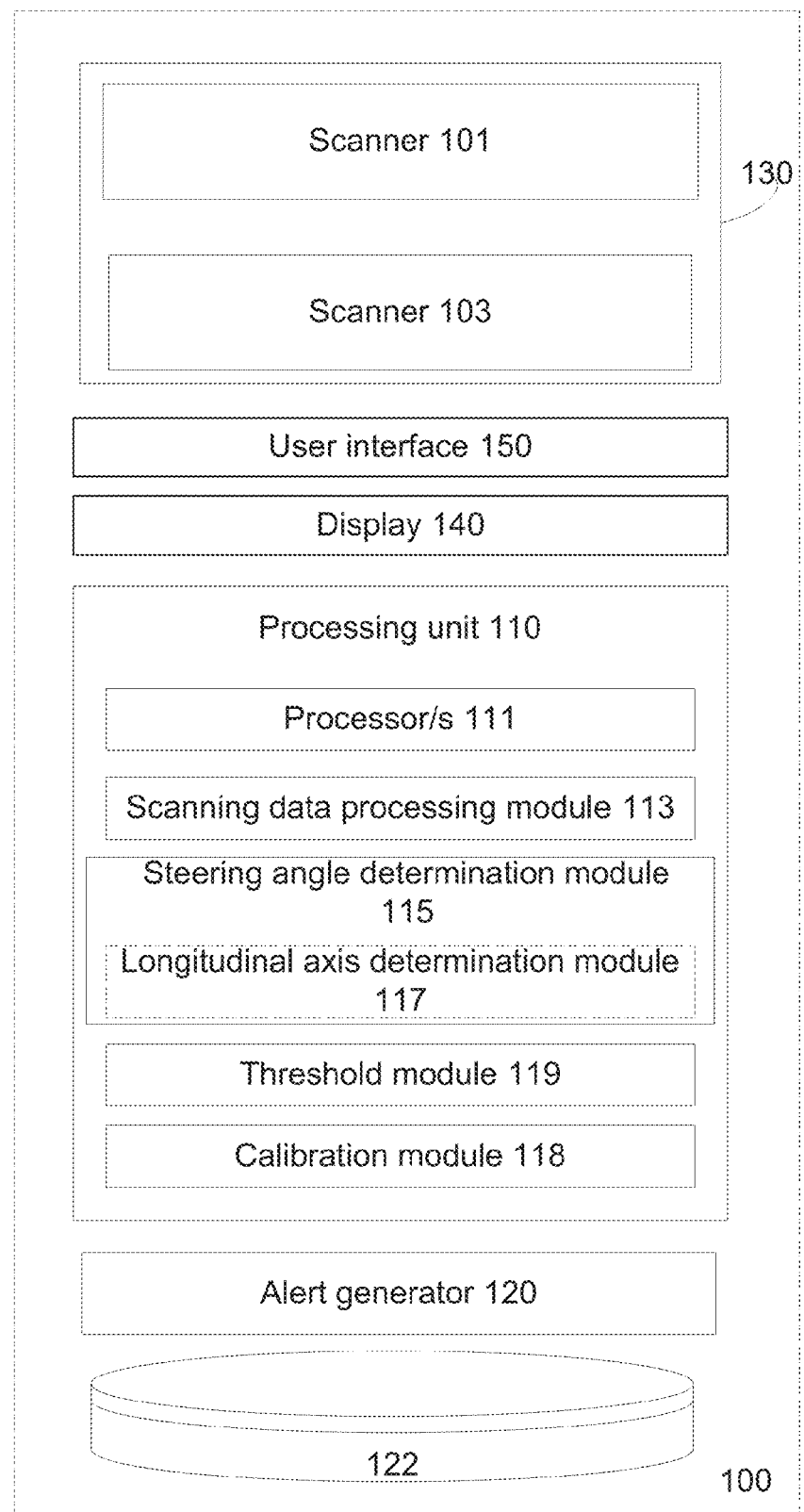
FIG. 1 is a functional block diagram schematically illustrating an example of a system for determining and monitoring of a steering-angle, in accordance with the presently disclosed subject matter.

In the drawings and descriptions set forth, identical reference numerals indicate those components that are common in different drawings. Elements in the drawings are not necessarily drawn to scale.

Unless specifically stated otherwise, as apparent from the following discussions, it is appreciated that throughout the specification discussions utilizing terms such as "obtaining", "determining", "comparing" or the like, include actions and/ or processes of a computer processor that manipulate and/or transform data into other data, said data represented as physical quantities, e.g. such as electronic quantities, and/or said data representing the physical objects.

The term "computer", "computer processor", "processor" or the like should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 5:
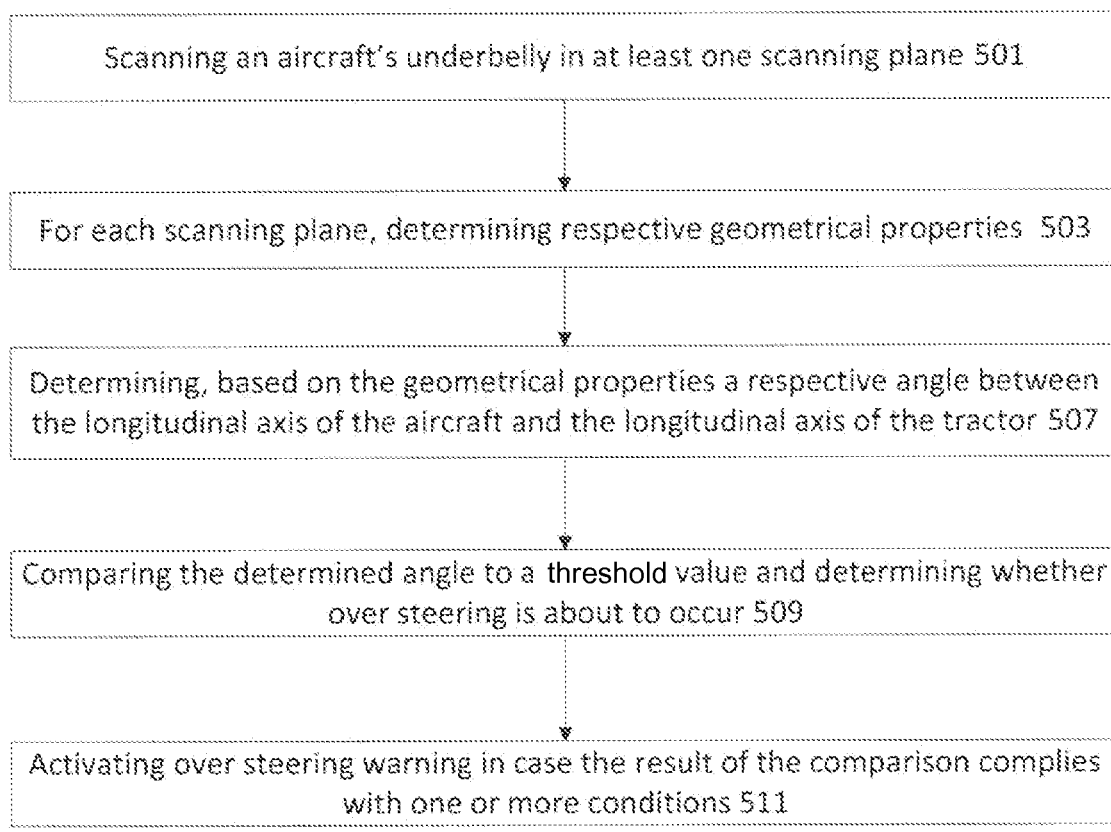
FIG. 5 is a flowchart illustrating an example of a sequence of operations which are performed, in accordance with the presently disclosed subject matter.
Figure 6:
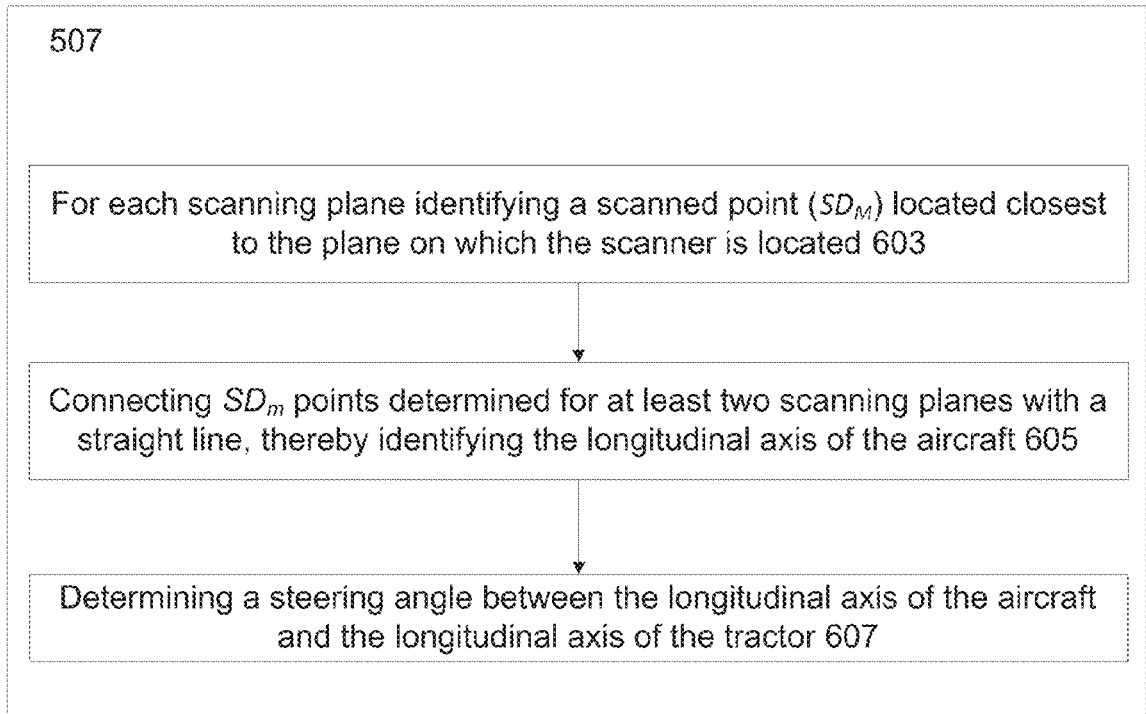
FIG. 6 is a flowchart illustrating one example of a sequence of operations performed for determining a steering-angle, according to the presently disclosed subject matter.

In embodiments of the presently disclosed subject matter, fewer, more and/or different stages than those shown in FIGS. 5 and 6 may be executed. In embodiments of the presently disclosed subject matter one or more stages illustrated in FIGS. 5 and 6 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Although the description predominantly refers to a tractor dedicated to transporting an aircraft, this is done by way of example and should not be construed as limiting in any way. Any other type of vehicle which can be used for leading an aircraft (herein "leading vehicle") is considered within the scope of the subject matter disclosed herein.

Bearing this in mind, attention is drawn to the figures. As explained above, when an aircraft is being led (pulled or pushed) by a tractor it is desirable to avoid over-steering. The subject matter disclosed herein includes, inter alia, a method and system which enables to determine the steering-angle between the longitudinal axis of a tractor and the longitudinal axis of an aircraft which is being led by the tractor (referred to herein as "steering-angle" in short). While an aircraft is being led, the steering-angle can be repeatedly calculated and compared to a threshold value defining a mechanical steering limit. In case the comparison complies with one or more predefined conditions (e.g. the steering-angle is equal or smaller the threshold value) a warning can be generated indicating to an operator that the steering-angle has reached (or is about to reach) its limit and should be adjusted accordingly.

FIG. 1 is a functional block diagram schematically illustrating an example of a system for determining and monitoring of a steering-angle, in accordance with the presently disclosed subject matter. System 100 can be configured for example as a subsystem on a tractor designed for leading aircrafts on the ground (e.g. pushback tractor).

System 100 comprises scanning device 130 configured to scan the aircraft's underbelly and provide scanning information with respect to a plurality of scanned points located on the aircraft's underbelly. Depending on the specific mode of operation of system 100, the system can comprise a single scanner or a plurality of scanners.

The scanners can be any one of various types of range finding devices such as a pulse laser scanner, modulated continuous wave light source scanner, radar, sonar range finder, etc. Scanners 101 and 103 are located at a fixed position on the tractor. The scanners can be positioned on the tractor's low profile platform to enable to scan the underbelly of the aircraft while the aircraft is connected to the tractor.

Scanning device 130 can comprise one single-plane scanner configured to scan the aircraft's underbelly in a single scanning plane. Alternatively scanning 130 can comprise one multi-plane scanner or two or more single-plane scanners (scanners 101 and 103 as illustrated by way of example in FIG. 1) or possibly a combination of single-plane and multi-plane scanners. A multi-plane scanner is used for scanning the aircraft's underbelly in multiple scanning planes. A similar result can be obtained by using multiple scanners.

In case scanning device 130 comprises two or more scanners, each scanner is positioned at a different location to scan a different section of the aircraft's underbelly in a different scanning plane. The position of the scanner (or scanners) is synchronized with the central longitudinal axis of the tractor. The term "synchronized" is used herein to indicate that the distance of the scanners from the central longitudinal axis of the tractor is known. The scanner can be positioned along the central longitudinal axis of the tractor, however this is not necessarily so. In case for example, two or more scanners are used, they can be positioned one in front of the other along the central longitudinal axis of the tractor.

System 100 further comprises processing unit 110, user interface (comprising for example, mouse and keyboard) 150 and display 140. In addition to the scanning device, other components of system 100 can be located on the tractor (the system being configured as a consolidated system). Alternatively, various components of system 100 can be located at a remote location, such as a remote control station, and may be configured to communicate with the scanning device over a communication network.

Figure 2:
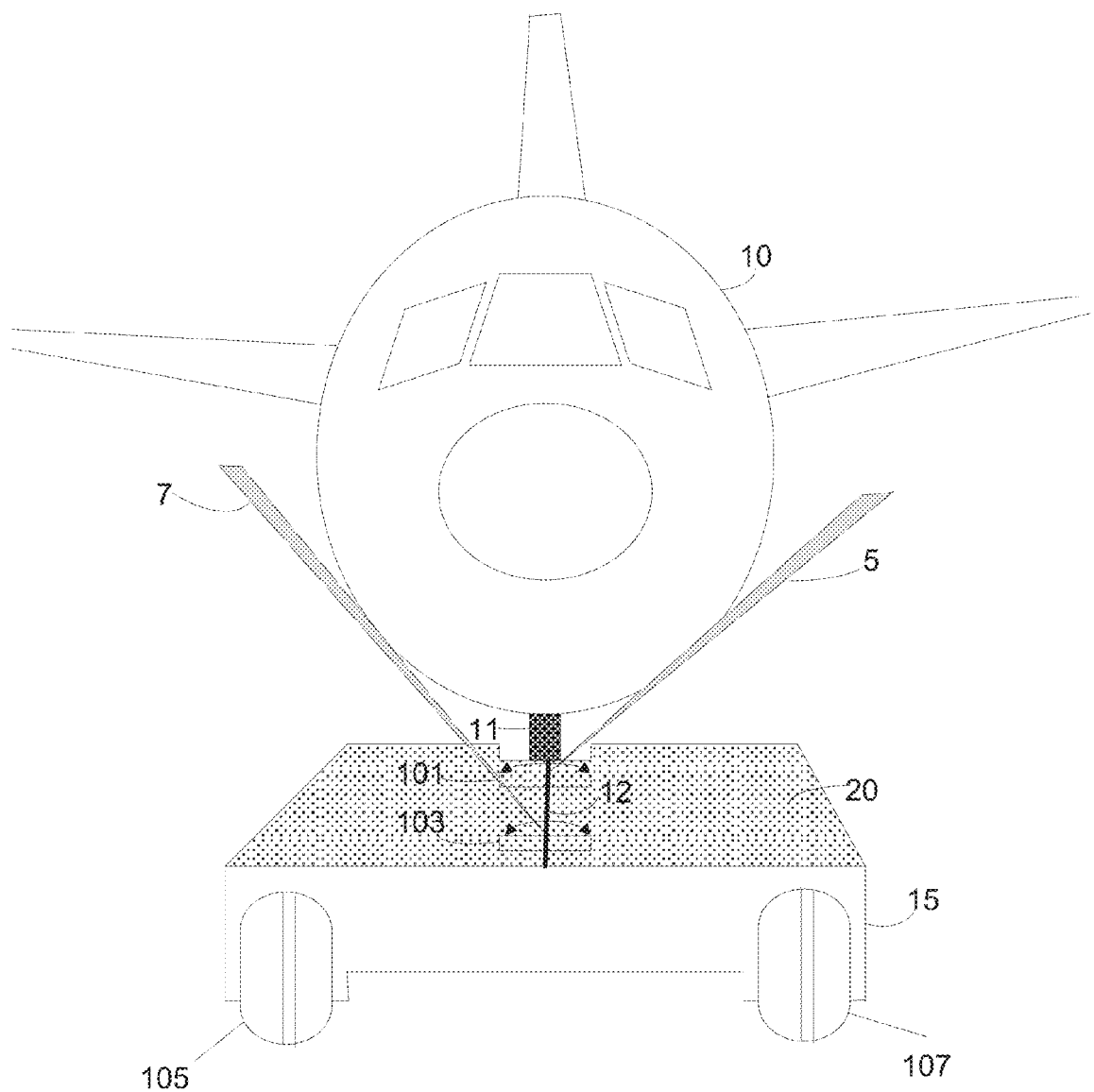
FIG. 2 is a schematic illustration of a front view of an aircraft being led by a tractor, in accordance with the presently disclosed subject matter.

FIG. 2 is a schematic illustration of a front view of an aircraft being led by a tractor, in accordance with the presently disclosed subject matter. FIG. 2 shows a cross section of tractor 15 being connected to the NLG of aircraft 10 (for simplicity, only front leg 11 of the NLG is shown in FIG. 2). Elements 105 and 107 illustrate wheels of the tractor. FIG. 2 depicts an example of two scanners (101 and 103) which are positioned on the tractor's platform 20 located beneath the body of aircraft 10 along the central longitudinal axis of the tractor 12. As mentioned above, different from that illustrated in FIG. 2, scanners 101 and 103 can be positioned on platform 20 at a known distance from the central longitudinal axis of the tractor. Scanners 101 and 103 are configured to scan the underbelly of aircraft 10 with scanning beams 5 and 7.

If scanners 101 and 103 are positioned beneath the body of the aircraft the scanners can be configured to scan the aircraft at a 90° elevation angle (the angle between platform 20 and the scanning plane). However this is not necessarily so, and the scanners can be configured at various elevation angles with respect to platform 20. For example, this may be so, if scanners 101 and 103 are not positioned directly beneath the body of the aircraft but rather in front of the body towards the tractor. In such a case, the scanners can be tilted at an angle pointing towards the aircraft to enable to scan the aircraft's underbelly. The scanners can be positioned on the tractor such that the projection of each scanning plane crosses the longitudinal axis of the tractor at a 90° degree angle, however this is not necessarily so.

Scanners 101 and 103 can be configured to scan the underbelly of the aircraft with discrete laser pulses in a lateral motion from side to side along a scanning plane (as indicated by the doubled arrows). Alternatively, each of scanners 101 and 103 can be a light source (e.g. laser scanner), configured with appropriate beam shaping optics, enabling to generate an optical laser screen capable of simultaneously scanning multiple points.

FIG. 3*a* is a schematic illustration of a side view of an aircraft being led by a tractor, in accordance with the presently disclosed subject matter. Similar to FIG. 2, FIG. 3*a* also shows 2 scanners (101 and 103) positioned on top of platform 20 located beneath aircraft 10. FIG. 3*a* shows the front wheel 17 of the NLG, which is connected to leg 11 and is being used by tractor 15 for leading the aircraft. Both scanners 101 and 103 are illustrated in FIG. 3*a* in front of front wheel 17. This is not necessarily so, however. In alternative configurations, scanners 101 and 103 (or any additional scanners which may be used) can be located on the other side of front wheel 17 or may be distributed on both sides of wheel 17. Scanners 101 and 103 are synchronized with the central longitudinal axis of the tractor.

The areas traversed by scanning beams 5 and 7 are shown as respective striped areas 7*a* and 5*a*. Notably, as the scanners are located under the aircraft's fuselage in close proximity, and the background surrounding the fuselage, from the point of view of the scanners, is expected to be predominantly empty of obstructions, low noise data is expected to be obtained during scanning.

Figure 3B:
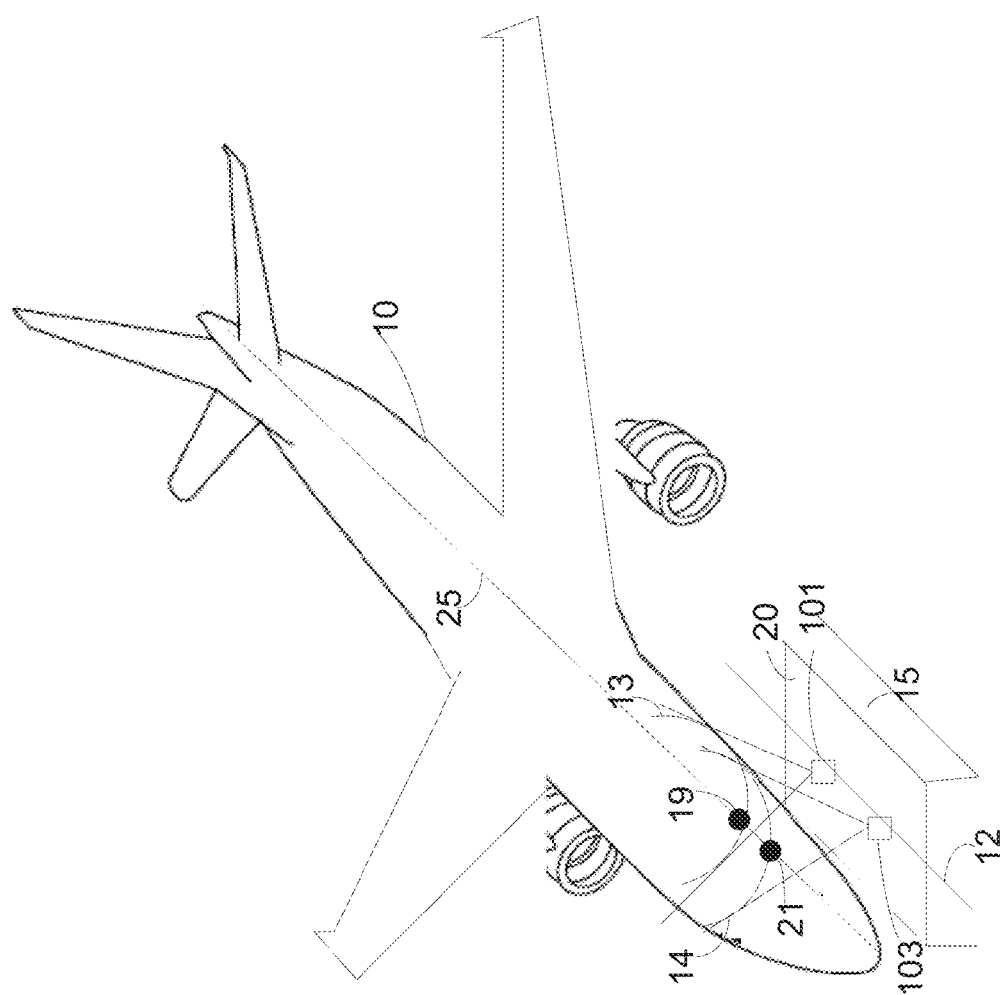
FIG. 3b is another schematic illustration of a transparent view of an aircraft being led by a tractor, in accordance with the presently disclosed subject matter.

FIG. 3*b* is another schematic illustration of a transparent view of an aircraft being led by a tractor, in accordance with the presently disclosed subject matter. Line 25 in FIG. 3*b* illustrates the longitudinal axis of the aircraft. The scanners shown in FIG. 2 and FIG. 3 form part of system 100 located on tractor 15 while the rest of the system components are not shown. It should be noted that FIGS. 2 and 3 are merely schematic illustrations and may not illustrate a completely accurate perspective view.

While the aircraft is being led, the scanners can be configured to continuously scan the underbelly of the aircraft. The beams which are reflected from the aircraft's underbelly during the scanning operations are detected by detectors located on the tractor. Based on the beam reflection, the range from each scanned point to a certain fixed point on the platform can be determined. Data indicative of the scanning beams reflections, which is generated during the scanning operations, is transmitted to processing unit 110. As explained in more detail below, processing unit 110 is configured, inter alia, to determine a real-time steering-angle based on this data.

Reverting to FIG. 1, processing unit 110 can comprise a computer memory (including one or more of volatile and non-volatile memory) operatively connected to one or more computer processors 111 configured for executing operations in response to instructions as described herein. Computer memory in processing unit 110 can comprise for example: scanning data processing module 113, steering-angle determination module 115 and threshold module 119. Optionally, steering-angle determination module 115 can comprise or be otherwise operatively connected to longitudinal axis determination module 117.

While the aircraft is being led by the tractor, scanning data processing module 113 is configured to process the data obtained by the scanners during the scanning operations and determine real-time geometric properties of the scanned aircraft's underbelly. The geometric properties which are determined include data indicative of the ranges between the scanned points and a predefined fixed point on the platform (e.g. a respective scanner or a point on the platform 20 where the scanner is located).

Scanning data processing module 113 can be configured to generate, for each scanning plane, a real-time record comprising the respective geometric properties determined during real-time monitoring of the steering angle. The generated real-time recorders can be stored in a data-repository 122 (which may comprise some type of non-transitory computer memory).

Optionally, the record generated by scanning data processing module 113 can include an image (e.g. a graph) showing the reflections of the beams in a given scanning plane of a given scanner. A typical aircraft's fuselage is a long hollow tube section. Thus, when scanned from underneath, an image or graph plotting the scanned points of the scanned underbelly would therefore show a parabola-like shape. A respective parabola-like image can be generated for each scanning plane based on the information obtained during scanning of the aircraft's underbelly. As each scanning plane scans the aircraft underbelly at a different location, a specific parabola-like image is generated for each scanning plane. A record representing the geometric properties of a given scanning plane can comprise a respective parabola-like shape.

In FIG. 3*a* and FIG. 3*b* elements 13 and 14 show schematic examples of parabola-like shapes on the scanned surface of the aircraft's underbelly generated by the reflections in scanning planes.

If the longitudinal axis of the aircraft and the longitudinal axis of the tractor coincide such that the steering-angle between the two is zero, the parabola-like shape is symmetrical. If, on the other hand, the steering-angle has a non-zero value the parabola is skewed to one side or the other, depending on the direction of the angle. Thus, any change in the angle between the longitudinal axis of the aircraft and the longitudinal axis of the tractor would result in a distinctive record and/or parabola-like image.

Figure 4:
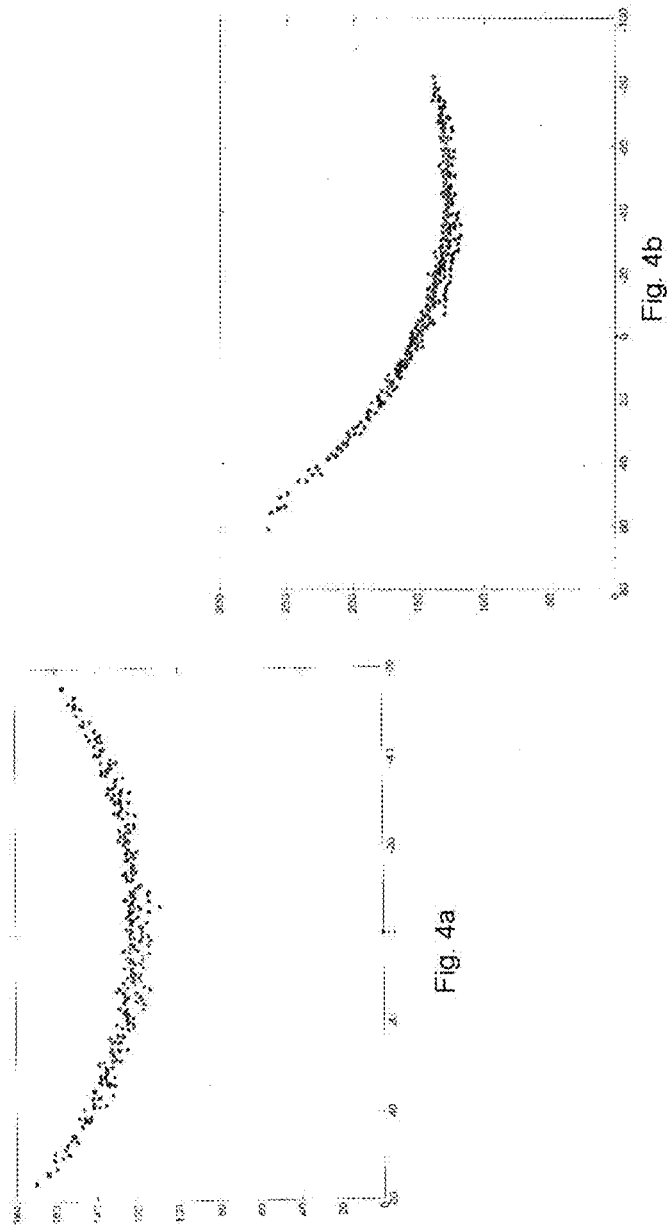
FIGS. 4a and 4b are examples of parabola-like images of different steering-angles, in accordance with the presently disclosed subject matter.

FIGS. 4*a* and 4*b* are examples of parabola-like images representing different steering-angles, in accordance with the presently disclosed subject matter. The graphs in FIG. 4 plot the reflection of scanned points. The x-axis is the scanning angle and the y-axis is the distance between the scanner and the scanned point on the aircraft's underbelly. FIG. 4*a* is an image of a symmetrical parabola-like image obtained when the value of the steering angle is around zero. FIG. 4*b* is an image of a non-symmetrical parabola-like image obtained when the value of the steering angle is a non-zero value. Note that since the information shown in FIGS. 4*a* and 4*b* includes the reflection obtained from more than one scanner, the graphs in FIG. 4 show a cluster of points rather than a consistent sequence of points.

Since the relative positions of a given tractor and a given aircraft (e.g. a certain type of tractor leading a certain type of aircraft) are substantially constant, and provided that the sensor is located at a known position on the tractor, a steering angle between the longitudinal axis of the aircraft and the longitudinal axis of the tractor is characterized by distinctive geometric properties which can be used for obtaining a distinctive parabola-like image. Thus, the value of a given steering-angle can be determined based on the respective geometric properties (possibly in a respective real-time record) generated in real-time by scanning data processing module 113.

Steering-angle determination module 115 is configured to determine the steering-angle between the longitudinal axis of the aircraft and the longitudinal axis of the tractor.

According to one example, determination of the steering-angle can be based on geometric properties of the record which is obtained from scanning the aircraft's underbelly. System 100 can comprise or be otherwise connected to data-repository 122 (e.g. comprising non-volatile computer memory) comprising data associating between geometric properties and a respective steering-angle.

For example, data-repository 122 can comprise multiple records (herein "stored records") where each record comprises information of a respective steering-angle which the record represents. The real-time geometric properties (possibly stored as a real-time record) can be compared to the information in data-repository 122. If a stored record having similar geometric properties to real-time geometric properties is found in data-repository 122, the respective steering-angle in the stored record can be identified as the real-time steering-angle. Similarity between the real-time geometric properties and stored records can be determined based on one or more predefined conditions (e.g. similarity can require complete identity between a real-time record and a stored record or only a certain degree of partial identity).

Similarly, stored records can include respective parabola-like images where each image is associated with a respective steering-angle which the image represents. A parabola-like image generated in real-time by scanning data processing module 113 can be compared with the information in data-repository 122 and used for identifying a stored image with similar geometric properties to the real-time image. Information indicative of the steering-angle which is represented by the stored image can be used for determining the steering-angle represented by the real-time image. Comparison between real-time and stored images can be based for example, on the actual images, derivatives of the images or geometric properties thereof.

The information which is stored in data-repository 122 can be obtained for example by performing a calibration process between a given type of tractor and a given type of aircraft. During the calibration process the aircraft and tractor can be positioned with various steering-angles. For each such steering-angle geometric properties are determined (and possibly also the respective parabola like images). This information can be stored in respective records and used during real-time operations of system 100. The same information can be used by different aircrafts and different tractors provided that their structures are sufficiently similar. Thus, a calibration process which is performed with one type of aircraft can possibly be used during leading of another type of aircraft. To this end system 100 can further comprise a calibration module 118 configured to perform the calibration process.

If the steering-angle is determined based on pre-stored information, scanning the aircraft's underbelly in one scanning plane (using a single scanner) may be adequate in some cases for determining the steering-angle with sufficient accuracy.

Optionally, steering-angle determination module 115 can comprise or be otherwise operatively connected to aircraft longitudinal axis determination module 117 configured to obtain data indicative of the longitudinal axis of the aircraft. Operations performed for identifying of the longitudinal axis of the aircraft are detailed below with reference to FIG. 6.

As mentioned above scanning device 130 is positioned on the tractor and synchronized with the central longitudinal axes of the tractor. Therefore, information indicative of the location of the longitudinal axes of the tractor is known and can be made available and used by steering-angle determination module 115.

Once the longitudinal axis of the tractor and longitudinal axis of the aircraft are obtained, steering-angle determination module 115 can determine the angle between the two axes.

Following the calculation of the steering-angle, the calculated angle can be compared to a given threshold value e.g. with the help of threshold module 119. Threshold module 119 can be further configured to generate an indication if the comparison complies with one or more conditions with respect to the threshold (e.g. the angle is equal to or smaller than the threshold value). The indication can be transmitted for example to alert generator 120 which can be configured in turn to generate an over-steering warning indicating to the operator that the steering-angle is beyond (or close to) the mechanical steering-angle limit. The warning can include for example any one or more of: generating a distinctive sound, turning on a warning light, displaying a warning indication on display 140.

During the operation of system 100, while an aircraft is being led, information can be displayed on display 140 (e.g. LCD or LED screen). For example, the current steering-angle value as determined by steering-angle determination module 115 can be continuously displayed. Optionally, a graphical illustration showing the relative position between the tractor and aircraft (as exemplified in FIG. 8a) can be displayed as well.

FIG. 5 is a flowchart illustrating an example of a sequence of operations which are performed, in accordance with the presently disclosed subject matter. Operations which are described with reference to FIG. 5 can be executed for example by system 100 described above with reference to FIG. 1.

At block 501 a scanning device (e.g. 130) is used for scanning the underbelly of the aircraft in one or more scanning planes. As explained above, the scanning device can comprise a single scanner or multiple scanners. The reflections of the beams in each scanning plane are received (at system 100) and geometric properties with respect to each scanning plain are determined (block 503). When multiple scanners are used, each scanner is fixed to the tractor platform (20) at a different location to enable scanning the aircraft's underbelly in a different scanning plane and obtaining respective geometric properties of the scanned underbelly. The position of the scanners is synchronized with the central longitudinal axis of the tractor. The geometric properties with respect to each scanning plane include at least the ranges of a plurality of scanned points from a fixed point on the platform.

A respective real-time record can be generated (e.g. by processing unit 110) for each scanning plane. As explained above the generated record comprises at least information indicative of the ranges of the scanned points which are scanned during a respective scanning operation (a full scanning of the aircraft's underbelly from side to side). Optionally, a respective parabola-like image of the scanned underbelly can be generated for each scanning plane. The parabola-like image can be stored as additional geometric properties in the record assigned to the respective scanning plane.

While the tractor is leading the aircraft, the scanners continuously scan the aircraft's underbelly and the information in the records is continuously updated. The operation described with reference to block 503 can be executed for example by module 113 described above.

Based on the geometric properties obtained in real-time, a respective steering-angle between the longitudinal axis of the aircraft and the longitudinal axis of the tractor is determined (block 507). This can be executed for example by module 115 described above.

As explained above, one method of determining a steering angle is based on similarity between real-time geometric properties (possibly in a real-time record) and geometric properties in stored records. If similarity between the real-time information and information in a given stored record, complies with one or more conditions, the real-time steering angle is determined according to the steering angle in the given stored record.

The determined steering-angle is compared to a threshold value (block 509). This can be executed for example by module 119 described above. An over-steering warning is activated in case the result of the comparison complies with one or more conditions (block 511).

The operations described with reference to FIG. 5 can be repeatedly performed while an aircraft is being led by a tractor to enable to continuously determine and monitor the current steering-angle in order to avoid over-steering. The steering-angle can be continuously displayed to an operator (e.g. on display 140).

As further explained above, another method of determining a steering angle is based on the determination of the longitudinal axis of the aircraft. This approach is elaborated below in more detail.

As explained above, the aircraft's underbelly can be scanned with two or more scanners (or a single multi-plane scanner) each scanning the underbelly in a different scanning plane. The geometric properties obtained with respect to each scanning plane are used for generating a respective record, which can optionally comprise a parabola-like image representing the scanned area of the aircraft's underbelly.

The projection of the parabola-like shape on a plane (e.g. projecting on platform 20) would show a straight line. The longitudinal axis of the aircraft is a straight line, which connects two or more projection lines of two or more different parabola-like images, each generated based on information obtained by a respective scanning plane.

FIGS. 7a to 7d show examples of different positions of the aircraft with respect to the tractor, in accordance with the presently disclosed subject matter. Each of the four FIGS. 7a to 7d shows an aircraft being connected to a tractor at a different steering-angle. Each of the four lines (projection lines 70) crossing the aircraft and the tractor represents a projection of a different scanning plane (possibly generated by 4 different scanners positioned on the tractor). The rectangle shape depicted on the left side of each of the four figures illustrates the angle between the longitudinal axis of the tractor (horizontal line 72) and longitudinal axis of the aircraft (line 74).

Figure 7A:
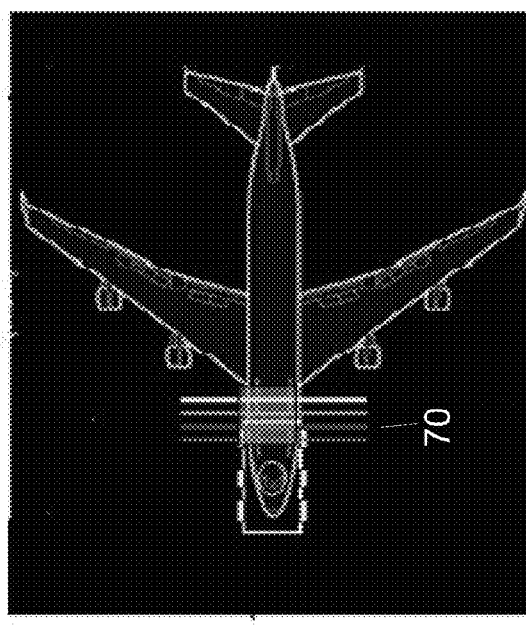
FIGS. 7a to 7d show examples of different positions of the aircraft with respect to the tractor, in accordance with the presently disclosed subject matter.
Figure 7C:
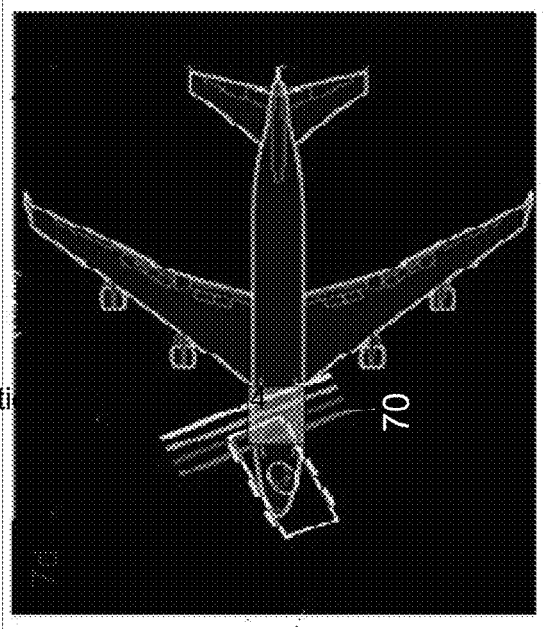
Figure 7B:
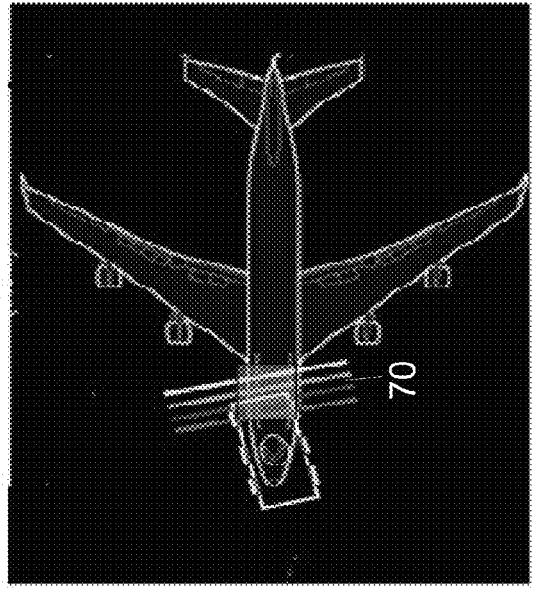
Figure 7D:
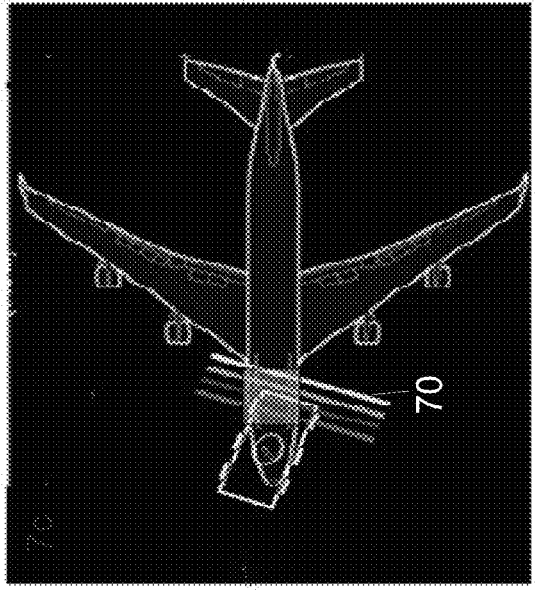

FIG. 7a shows an aircraft connected to the tractor with a 0° steering-angle. A straight line connecting the center of each of the four projection lines provides the longitudinal axis of the aircraft. Note that in FIG. 7a the longitudinal axis of the tractor and longitudinal axis of the aircraft coincide and all 4 projection lines 70 are positioned at a 90° angle with respect to the longitudinal axis of the tractor and the longitudinal axis of the aircraft. Each one of FIGS. 7b to 7d shows an aircraft connected to the tractor with various none 0° steering-angles.

Thus, the central longitudinal axis of the aircraft can be determined as a straight line which crosses the projection lines of different scanning planes at a point which divides each projection line in the middle.

One method proposed herein for identifying the sought after axis is based on the identification of a scanned point ($Sd_m$), which is located at the closest distance from platform 20.

FIG. 6 is a flowchart illustrating an example of a sequence of operations performed for determining a steering-angle between the longitudinal axis of the aircraft and the longitudinal axis of the tractor, according to the presently disclosed subject matter. The operations which are described with reference to FIG. 6 provide one non-limiting example of a procedure for calculating the steering-angle as mentioned above in block 507 in FIG. 5. Operations described with reference to FIG. 6 can be executed for example by system 100 described above with reference to FIG. 1 (e.g. by steering angle determination module 115).

At block 603, for each one of two or more scanning planes, a scanned point ($Sd_m$) on the aircraft's underbelly, which is located at the closest distance from platform 20 (or an extension thereof), is determined. The distance between each scanned point and platform 20 can be calculated by various methods. A number of such methods are described below by way of non-limiting example while it is noted that any other alternative method is considered within the scope of the subject matter disclosed herein.

Figure 8A:
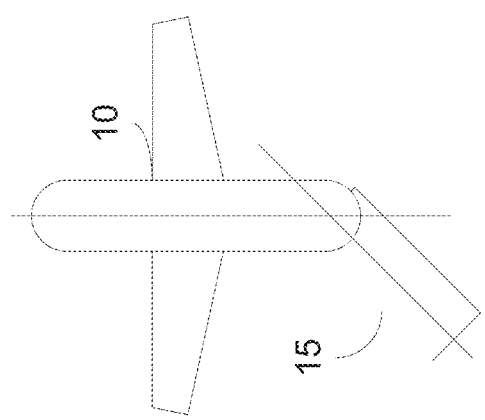
FIGS. 8a and 8b are schematic illustrations showing a tractor's platform 20 located beneath aircraft 10 underbelly, in accordance with the presently disclosed subject matter.
Figure 8B:
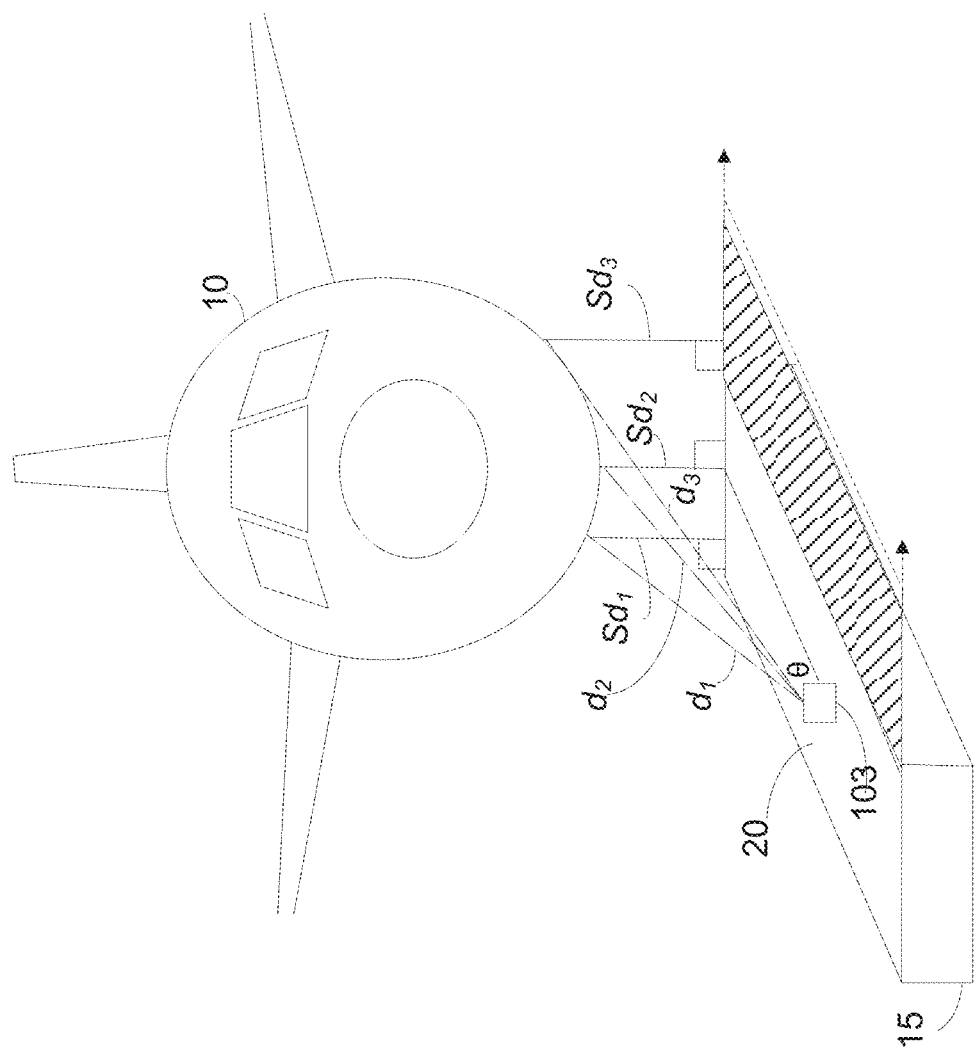

FIGS. 8a and 8b are schematic illustrations showing a tractor's platform 20 located beneath the underbelly of aircraft 10, in accordance with the presently disclosed subject matter. FIG. 8a is a top view schematically illustrating an example of a relative position of tractor 15 with respect to aircraft 10. FIG. 8b schematically illustrates a front view of aircraft 10 and tractor 15 in the same position as in FIG. 8a. FIG. 8b shows only a single scanner (103), however, this is done for the sake of simplicity and clarity of the illustration only and the same principles are applicable to multiple scanners as well.

FIG. 8b shows 3 scanning beams $d_1$, $d_2$ and $d_3$. Each beam impinges on the aircraft's underbelly at a different point. The shortest distance between each scanned point and platform 20 is indicated by lines $Sd_1$, $Sd_2$ and $Sd_3$. Note that $Sd_3$ connects the scanned point with a virtual plane extending from platform 20 (striped area).

The value of the shortest distance between a given scanned point i and platform 20 can be calculated for example by:

$$Sd_i = d_i \sin \theta$$

Where $d_i$ is the distance of travel of a scanning beam to scanned point i, and $\theta$ is the elevation scanning angle (e.g. the angle between platform 20 and the respective beam scanning point i).

Based on the calculation of the distance $Sd_i$ for each scanned point the scanned point located at the shortest distance from platform 20 ($Sd_{m=>}Sd$ minimum) can be determined.

Alternatively, $Sd_m$ can be determined by identifying two different scanned points on the aircraft's underbelly which are located at the same distance from platform 20 and a third scanned point located in the middle between the two scanned points.

In a further option, if a parabola-like image is generated, the minimum point of the parabola is located at the shortest distance from platform 20. Thus, scanned point $Sd_m$ can be determined by identifying the minimum point of the parabola-like image.

Having identified a respective point $Sd_m$ in at least two different scanning planes, the identified points are connected by a straight line (block 605). The line connecting two or more $Sd_m$ points indicates the central longitudinal axis of the aircraft.

Reverting to FIG. 3b it shows two scanners (101 and 103) scanning the underbelly of aircraft 10 in two different scanning planes. The scanned points on the aircraft's underbelly in the two scanning planes are indicated by parabola-like shape 13 and parabola like shape 14. A respective minimum point (19, 21) of each of the two parabola-like shapes lies on line 25 which indicates the central longitudinal axis of the aircraft.

As the central longitudinal axis of the tractor can be obtained by means which are known per se, the steering-angle between the central longitudinal axis of the tractor and the now available longitudinal axis of the aircraft can be determined (block 607).

The angle between the longitudinal axis of the aircraft and the longitudinal axis of the tractor can be determined using various methods. One approach for determining the angle can be based on analytical geometry principles and trigonometric equations.

For example, assuming the central longitudinal axis of the tractor is aligned with the y-axis of a Cartesian coordinates system, the x,y values of each $Sd_m$ point can be determined. The y-coordinate of each $Sd_m$ point of a given scanning plane can be determined based on the known location of a respective scanner with respect to the longitudinal axis of the tractor.

Assuming the scanners are configured to scan the aircraft in a scanning plane which is at a 90° angle with respect to the longitudinal axis of the tractor, the x-coordinate of each $Sd_m$ point of a respective scanning plane can be determined based on the distance measured to the $Sd_m$ point and the elevation scanning angle (e.g. the angle between platform 20 and beam reflected from point $Sd_m$).

Otherwise, if the scanning plane is not at a 90° angle with respect to the longitudinal axis of the tractor, the x-coordinate of each $Sd_m$ point of a respective scanning plane can be determined based on distance measured to the $Sd_m$ point, the elevation scanning angle and the lateral scanning angle (the lateral angle between the central longitudinal axis of the tractor and a beam reflected from point $Sd_m$). The elevation scanning angle and the lateral scanning angle can be obtained from the scanner. Based on this information, the angle between the central longitudinal axis of the tractor and the central longitudinal axis of the aircraft can be calculated.

It is to be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A method of determining a steering-angle between a leading vehicle and an aircraft, wherein the leading vehicle is connected to the aircraft and is configured to lead the aircraft on the ground, the leading vehicle comprising a platform and one or more scanners that are positioned on the platform, the method comprising:
   a) obtaining scanning information of at one or more scanning planes of an underbelly of the aircraft, the scanning information being generated by the one or more scanners, wherein the scanning information of each of the one or more scanning planes comprises a respective group of scanned points of the aircraft's underbelly;
   b) determining, for each scanning plane, respective real-time geometric properties that comprise a respective real-time parabolic image, the respective real-time geometric properties including at least data indicative of ranges between scanned points in the respective group and a certain fixed point on the platform;
   c) determining, based on the respective real-time geometric properties, a steering-angle between a longitudinal axis of the leading vehicle and a longitudinal axis of the aircraft; and
   d) controlling the leading vehicle so as to maintain the steering-angle, as determined in said step c), within a certain acceptable range.

2. The method according to claim 1, further comprising:
   obtaining information with respect to one or more stored records, each stored record comprising data indicative of a respective steering-angle and respective geometric properties; and
   when similarity between the respective real-time geometric properties and the respective geometric properties in a given stored record, from the one or more stored records, complies with one or more predefined conditions, determining the real-time steering-angle based on the respective steering-angle in the given stored record.

3. The method according to claim 2, wherein the stored record comprises information indicative of a respective parabolic image; the method further comprising:
   determining, for each scanning plane, the respective real-time parabolic image; and
   when similarity between the respective real-time parabolic image and the parabolic image in a given stored record, from the one or more stored records, complies with one or more predefined conditions, determining the steering-angle based on the respective steering-angle in the given stored record.

4. The method according to claim 1, further comprising:
   scanning the aircraft's underbelly in at least two scanning planes;
   for each scanning plane, identifying in the respective group of scanned points a respective scanned point ($Sd_m$) located at the shortest distance from a predefined fixed point on the platform;
   connecting the respective scanned points ($Sd_m$) of the at least two scanning planes with a straight line, thereby identifying the longitudinal axis of the aircraft.

5. The method according to claim 4, wherein identification of respective scanned points $Sd_m$ comprises any one of the following groups of operations:

a. for each of the two or more scanning planes, generating a parabola representing the scanned aircraft's underbelly; and determining a minimum point of the parabola;

b. for each scanning plane, determining a scanned point located at a shortest range from the certain fixed point on the platform; and c. for scanning a plane, identifying two different scanned points in the respective group located at a same distance from the platform; and identifying a scanned point located in a middle between the two different scanned points.

6. The method according to claim 1, further comprising:
generating a warning indicating that over-steering is occurring or is about to occur, when the steering-angle complies with one or more predefined conditions.

7. The method according to claim 1, further comprising:
repeating the determining of the steering-angle while the aircraft is being led by the leading vehicle; and
continuously monitoring the steering-angle.

8. The method according to claim 1, wherein the leading vehicle is a tractor configured to transport an aircraft, the tractor comprising a low profile platform configured to fit beneath the aircraft's underbelly.

9. A scanning system that determines a steering-angle between a leading vehicle and an aircraft, wherein the leading vehicle is connected to the aircraft and is configured to lead the aircraft on a ground, wherein the leading vehicle comprises a platform, the system comprising:
one or more scanners; and
a processing unit, operatively connectable to the one or more scanners, the processing unit comprising at least one processor,
wherein the one or more scanners are positioned on the platform at a known distance from a central longitudinal axis of the leading vehicle and are configured to scan an underbelly of the aircraft and generate scanning information with respect to one or more scanning planes, the scanning information of each scanning plane comprising a respective group of scanned points of the aircraft's underbelly; and
wherein the at least one processor is configured to:
a) obtain the scanning information and determine, for each scanning plane, respective real-time geometric properties, the respective real-time geometric properties including at least data indicative of ranges between scanned points in the respective group and a certain fixed point on the platform;
b) determine, based on the respective real-time geometric properties that comprise a respective real-time parabolic image, a steering-angle between a longitudinal axis of the leading vehicle and a longitudinal axis of the aircraft; and
c) generate instructions directed for maintaining the steering-angle, as determined in step b), within a certain acceptable range.

10. The system according to claim 9, wherein the at least one processor is further configured to:
obtain information with respect to one or more stored records, each stored record comprising data indicative of a respective steering-angle and respective geometric properties; and
determine the real-time steering-angle based on the respective steering-angle in the given stored record, when similarity between the real-time geometric properties and the geometric properties in a given stored record, from the one or more stored records, complies with one or more predefined conditions.

11. The system according to claim 10, wherein the stored record comprises information indicative of a respective parabolic image, the at least one processor being further configured to:
determine, for each scanning plane the respective real-time parabolic image;
determine the steering-angle based on the respective steering-angle in the given stored record, when similarity between the real-time parabolic image and the parabolic image in a given stored record, from the one or more stored records, complies with one or more predefined conditions.

12. The system according to claim 9, wherein the one or more scanners is configured to scan the aircraft's underbelly in at least two scanning planes, and the at least one processor is further configured to:
for each scanning plane, identify in the respective group of scanned points a respective scanned point ($Sd_m$) located at the shortest distance from a predefined fixed point on the platform, and
connect the respective scanned points ($Sd_m$) of the at least two scanning planes with a straight line, thereby identifying the longitudinal axis of the aircraft.

13. The system according to claim 12, wherein the at least one processor is configured to execute the following operations for identifying a respective scanned point $Sd_m$, the operations comprising:
a. for each of the two or more scanning planes, generating a parabola representing the scanned aircraft's underbelly; and
determining a minimum point of the parabola;
b. for each scanning plane, determining a scanned point located at a shortest range from the certain fixed point on the platform; and
c. for scanning a plane, identifying two different scanned points in the respective group located at a same distance from the platform; and
identifying a scanned point located in a middle between the two different scanned points.

14. The system according to claim 12, wherein the at least one processor is configured to determine the steering-angle and is configured for identifying the longitudinal axis of the aircraft.

15. The system according to claim 12, wherein the at least one processor is further configured to generate a warning indicating that over-steering is occurring or is about to occur, when the steering-angle complies with one or more predefined conditions.

16. The system according to claim 9, wherein the one or more scanners are positioned on the central longitudinal axis of the leading vehicle.

17. The system according to claim 9, comprising two or more scanners, each scanner being configured to scan the aircraft's underbelly from a different position in a different scanning plane.

18. A non-transitory computer-readable storage medium having stored therein instructions that, when executed by a computing device, cause the computing device to determine a steering-angle between a leading vehicle and an aircraft, wherein the leading vehicle is connected to the aircraft and is configured to lead the aircraft on a ground, and wherein the leading vehicle comprises a platform and one or more scanners which are positioned on the platform, and an alert generator comprising at least one hardware element, the alert generator generating a warning when operated, the instructions causing the computing device to perform functions comprising:

obtaining scanning information of at one or more scanning planes of an underbelly of the aircraft, the scanning information being generated by the one or more scanners, wherein the scanning information of each of the one or more scanning planes comprises a respective group of scanned points of the aircraft's underbelly;

determining, for each scanning plane, respective real-time geometric properties that comprise a respective real-time parabolic image, the respective real-time geometric properties including at least data indicative of ranges between scanned points in the respective group and a certain fixed point on the platform;

determining, based on the respective real-time geometric properties, a steering-angle between a longitudinal axis of the leading vehicle and a longitudinal axis of the aircraft; and initiating a signal that controls the alert generator to provide the warning when the steering-angle complies with one or more predefined conditions which indicate that over-steering is occurring or is about to occur.

19. A method of determining a steering-angle between a leading vehicle and an aircraft, wherein the leading vehicle is connected to the aircraft and is configured to lead the aircraft on a ground, the leading vehicle comprising a platform, one or more scanners that are positioned on the platform, and an alert generator comprising at least one hardware element, said alert generator generating a warning when operated, the method comprising:

obtaining scanning information of at one or more scanning planes of an underbelly of the aircraft, the scanning information being generated by the one or more scanners, wherein the scanning information of each of the one or more scanning planes comprises a respective group of scanned points of the aircraft's underbelly;

determining, for each scanning plane, respective real-time geometric properties that comprise a respective real-time parabolic image, the respective real-time geometric properties including at least data indicative of ranges between scanned points in the respective group and a certain fixed point on the platform;

determining, based on the respective real-time geometric properties, a steering-angle between a longitudinal axis of the leading vehicle and a longitudinal axis of the aircraft; and operating the alert generator to provide the warning when the steering-angle complies with one or more predefined conditions which indicate that over-steering is occurring or is about to occur.

20. A scanning system that determines a steering-angle between a leading vehicle and an aircraft, wherein the leading vehicle is connected to the aircraft and is configured to lead the aircraft on a ground, and wherein the leading vehicle comprises a platform, the system comprising:

one or more scanners; and a processing unit, operatively connectable to the one or more scanners, wherein the one or more scanners are positioned on the platform at a known distance from a central longitudinal axis of the leading vehicle and are configured to scan an underbelly of the aircraft and generate scanning information with respect to one or more scanning planes, the scanning information of each scanning plane comprising a respective group of scanned points of the aircraft's underbelly; and wherein the at least one processor is configured to:

obtain the scanning information and determine, for each scanning plane, respective real-time geometric properties, the respective real-time geometric properties including at least data indicative of ranges between scanned points in the respective group and a certain fixed point on the platform;

determine, based on the respective real-time geometric properties that comprise a respective real-time parabolic image, a steering-angle between a longitudinal axis of the leading vehicle and a longitudinal axis of the aircraft; and initiate a signal that generates a warning when the steering-angle complies with one or more predefined conditions which indicate that over-steering is occurring or is about to occur.

\* \* \* \* \*